US008744412B1

(12) United States Patent
Cazanas et al.

(10) Patent No.: US 8,744,412 B1
(45) Date of Patent: Jun. 3, 2014

(54) LAW ENFORCEMENT VEHICLE INFORMATION AUTHORIZATION SYSTEM

(75) Inventors: Carlos A. Cazanas, Bethlehem, PA (US); Azam Khan, Franklin, NJ (US); Matthew Butz, Haslet, TX (US)

(73) Assignee: Cellco Partnership, Basking Ridge, NJ (US)

( * ) Notice: Subject to any disclaimer, the term of this patent is extended or adjusted under 35 U.S.C. 154(b) by 736 days.

(21) Appl. No.: 12/823,771

(22) Filed: Jun. 25, 2010

(51) Int. Cl.
*H04L 12/58* (2006.01)
*H04W 4/12* (2009.01)
*H04L 29/08* (2006.01)
*G08G 1/0962* (2006.01)

(52) U.S. Cl.
CPC .............. *H04W 4/12* (2013.01); *H04L 12/5895* (2013.01); *H04L 29/08108* (2013.01); *G08G 1/0962* (2013.01)
USPC ...................... 455/412.1; 455/403; 340/426.1; 701/31.4

(58) Field of Classification Search
CPC ................ H04W 4/12; H04L 12/5895; H04L 29/08108; G08G 1/0962
USPC ............. 455/404.1–404.2; 701/117; 348/148; 340/933, 466, 426.28, 928, 426.11, 340/825.69; 702/122
See application file for complete search history.

(56) References Cited

U.S. PATENT DOCUMENTS

| 5,550,551 | A | * | 8/1996 | Alesio | 342/457 |
| 5,661,473 | A | * | 8/1997 | Paschal | 340/10.1 |
| 6,137,424 | A | * | 10/2000 | Cohen et al. | 340/933 |
| 7,844,247 | B2 | * | 11/2010 | Chen et al. | 455/404.1 |
| 2003/0216880 | A1 | * | 11/2003 | Endoh | 702/122 |
| 2005/0073395 | A1 | * | 4/2005 | Choi | 340/426.11 |
| 2006/0250272 | A1 | * | 11/2006 | Puamau | 340/825.69 |
| 2009/0309709 | A1 | * | 12/2009 | Bevacqua et al. | 340/426.18 |
| 2010/0094500 | A1 | * | 4/2010 | Jin | 701/29 |

OTHER PUBLICATIONS

Entire USPTO Prosecution History of Cazanas et al., U.S. Appl. No. 12/823,737, filed Jun. 25, 2010, entitled Collision Avoidance System Using Telematics Unit.
Entire USPTO Prosecution History of Dunne, U.S. Appl. No. 11/785,448, filed Apr. 18, 2007, entitled Hierarchical Telematics Emergency Call Direction.
Entire USPTO Prosecution History of Dunne et al, U.S. Appl. No. 11/819,188, filed Jun. 26, 2007, entitled Network Activation PF a Telematics Unit for Wireless Communication.
Entire USPTO Prosecution History of Cazanas et al, U.S. Appl. No. 12/512,627, filed Jul. 30, 2009, entitled Broadcast Media Information Capture and Communication via a Wireless Network.
Entire USPTO Prosecution History of Bennett et al, U.S. Appl. No. 12/491,861, filed Jun. 25, 2009, entitled Systems and Methods for Mobile Station Validation.

* cited by examiner

Primary Examiner — Mahendra Patel

(57) ABSTRACT

The various examples disclosed herein relate to systems, methods, and equipment that allow law enforcement to access vehicle identification information stored in a vehicle telematics unit, as well as other vehicle related information, wirelessly directly from a user's vehicle without going through wireless mobile network using an authorization code. The authorization code allows authorized law enforcement personnel to communicate directly with the vehicle and gain access to vehicle information while still keeping the information private.

24 Claims, 4 Drawing Sheets

LAW ENFORCEMENT VEHICLE INFORMATION AUTHORIZATION SYSTEM

TECHNICAL FIELD

The present subject matter relates to techniques and equipment for a telematics unit in an operator's vehicle to wirelessly provide confidential information from one vehicle to another, for example to provide vehicle registration information in response to a request from a law enforcement vehicle.

BACKGROUND

Currently, if a police officer or other law enforcement official wants to learn information about a particular motor vehicle, he must use the license plate number attached to the vehicle. This number must be entered into a secure database to protect the private information of the vehicle owner. By entering the plate number into the relevant database, information such as the vehicle's make, model, ownership, and other data may be obtained. Removal of the assigned license plate, or replacement of the assigned license plate with an incorrect plate, prevents accurate information about the vehicle from being obtained by these authorities.

Additionally, monitoring systems exist that allow companies or other enterprise organizations that use vehicles, to transport their goods or for other enterprise purposes, to monitor vehicle information such as the location of the vehicle as well as distance traveled per day and the amount of fuel used. The monitoring systems use global positioning satellite (GPS) receivers and wireless communication devices in the vehicles to send location and velocity information regarding the fleet to the base station of the wireless communication service provider. This information is then relayed to the monitoring party. This information must pass through the base station of the service provider before reaching the intended recipient. However, the intended recipient is usually affiliated with or serving the enterprise, not law enforcement.

Further, if a vehicle is speeding, methods and equipment exist that allow a third party to decelerate the vehicle. However, these requests must travel through a network service provider in order to be carried out thereby causing a lag time between when the request is sent and when the request is carried out. This lag in time may prove dangerous if the vehicle is traveling at significant speeds through heavy traffic or highly populated areas. Moreover, red light cameras sometimes have difficulty obtaining accurate license plate information in poor weather conditions such as in rain or fog. A vehicle running a red light or stop sign may violate the law without repercussions.

Increasingly sophisticated telematics systems have been developed to detect an emergency condition or activation, and in response, initiate a call to a call center. Systems have been developed for monitoring fixed customer locations or personnel at specific sites as well as for vehicle applications. For motor vehicle applications, for example, an onboard system monitors one or more sensors to determine when a crash has occurred. Upon detecting a crash condition, the onboard system activates a cellular transceiver to initiate a cellular telephone call to a call center of the telematics service provider (TSP). Upon connection to the call center, the system may communicate certain data, such as location determined by global positioning satellite (GPS) processing, identification data and crash related data. After the data transmission, the call is converted to a voice call in which a TSP representative at the call center can attempt voice communication with an occupant of the vehicle. The TSP also offers mechanisms for the representative to contact emergency service personnel in the area, to respond appropriately to the incident.

The existing telematics technologies do not provide data, such as vehicle identification, location, or velocity, directly to law enforcement personnel. Further, although the telematics unit in a vehicle may have information useful to law enforcement personnel, there is currently no way for such personnel to readily trigger a report of the information and gain access to it. Additionally, the TSP had no information regarding how long it will take for law enforcement, who may be the first responders in an emergency, to arrive until after contacting emergency service personnel.

In order to obtain information about the vehicle, a party such as law enforcement personnel must first contact a telematics service provider with a request for information about a particular vehicle. To identify the vehicle, the law enforcement personnel must use the vehicle's license plate information. This information may be inaccurate if the license plate of a particular vehicle has been switched with another. Moreover, confirmation that the vehicle information is correct cannot be obtained in a situation where law enforcement personnel wants information about a vehicle that has already driven by the law enforcement official's location.

In situations where a vehicle is parked illegally, law enforcement personnel must type or write in the vehicle's license plate number to issue a ticket. If the law enforcement official types or writes in an incorrect number, this error may not be corrected if vehicle is no longer parked in the same place. Such user error may not be noticed until it is too late to correct.

Additionally, law enforcement personnel cannot get current information regarding the vehicle's velocity and speed without using a laser gun pointed at the vehicle. A velocity reading may not be accurate without a clear view from the laser or radar gun to the target vehicle.

Further, when law enforcement arrives at the scene of an accident, law enforcement personnel must estimate the velocity at which the vehicle was traveling just prior to the crash using tire breaking tracks on the road, damage to the vehicle, and other indicators. These indicators have decreased with the addition of antilock breaking systems thereby leaving law enforcement with less information to use in assessing a crash.

SUMMARY

The teachings and telematics units discussed herein provide law enforcement with the ability to wirelessly obtain private vehicle information, such as vehicle identification number, using an authorization code. Law enforcement obtains the information directly from the vehicle itself, however, use of the authorization code allows the private information of the vehicle user to remain confidential. The examples provided herein also allow law enforcement to obtain additional information that may be useful for law enforcement personnel in their jobs.

For example, a method is disclosed herein whereby law enforcement sends a message directly to a vehicle requesting vehicle identification data along with an authorization code that may allow access to such information. The vehicle receiving the request verifies that the authorization code gives the requesting party access to the information. If such authorization code is valid, the vehicle identification information will be transmitted to the requesting law enforcement personnel. In some examples, additional information such as the vehicle's location and velocity and/or routing information may be included. In other examples, the a vehicle may be responsive to a request to decelerate included in an information request message. Further, in some examples, the information requested as well as the authorization code used may be sent to the call center of a telematics service provider (TSP) and/or output to the user via the user interface.

The detailed description discloses examples of devices that may be used to carry out the processes outlined above. A telematics control unit and memory are disclosed. In examples provided, the memory stores the authorization code and the telematics control unit processes the information in the received message. It authenticates the authorization code received. In some examples, the telematics unit may hold multiple authorization codes such that different branches of law enforcement may be associated with different authorization codes. Different access rights may be associated with the different authorization codes. In some examples, the authorization code could be used to identify the law enforcement personnel attempting to access the information. Additionally, a wireless transmitter and receiver are disclosed and may be used to send and receive the information request messages from law enforcement, e.g. without going through the mobile communication network and/or telematics service providers with which the telematics unit normally communicates.

In some examples, a user interface is disclosed. The user interface may be used to notify a vehicle user that a request for vehicle identification or additional information has been received. The notification may identify the authorization code used, the information requested, as well as other information deemed useful to the user.

The examples of telematics units and method of operation thereof described below and shown in the drawings may provide one or more of the following advantages.

One advantage is that law enforcement no longer needs to trust the license plate in order to obtain information about a particular vehicle. A stored vehicle identification number (VIN) may be accessed wirelessly in order to identify the vehicle and any related information that law enforcement wants. Additionally, the information may be obtained from the vehicle while still keeping the requested information private.

Another advantage is information related to vehicle velocity, and thereby speed, may be obtained without using a laser gun, radar gun or the like. If a vehicle is traveling at an unsafe speed, law enforcement may cause the vehicle to slow down. This may be advantageous in situations where a driver may be startled by a law enforcement vehicle's flashing lights and sirens. Additionally, this may be advantageous if the vehicle is weaving through traffic creating a hazard for other vehicle drivers. Further, a request to decelerate the vehicle or disable it may be sent to the vehicle directly from law enforcement thereby reducing the amount of lag time between when the request is sent and when it is received.

Alternatively, it may also be advantageous if a vehicle runs a red light and the camera cannot accurately identify the vehicle by license plate information such as when the red light camera is trying to capture the information in rainy or foggy weather conditions. This may also be advantageous if used to ensure electronic toll collection. In some examples, it may be used to assist in electronic toll collection itself.

Another advantage is that the law enforcement authentication processing is incorporated in or coupled to a telematics unit, that is to say a system already present in many vehicles; and as a result it is not necessary to develop and deploy a separate additional system for law enforcement authentication. Instead, law enforcement authentication can leverage or enhance services offered via the telematics unit.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities, and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to systems, methods, and equipment that allow law enforcement personnel to obtain confidential information about a vehicle while still keeping the information private. The information is kept confidential by requiring a specific authorization code be authenticated before any requested information is sent to the requesting party. This information includes the vehicle identification number so that law enforcement personnel no longer need to trust the license plate number to obtain information about the vehicle. Additionally, the information provided ensures that vehicle information is not lost because of user error when the law enforcement official accidentally writes down or inputs incorrect license plate information.

The examples herein also allow law enforcement to obtain additional information useful to law enforcement which may be programmed on the vehicle. This information may help law enforcement carry out their jobs and respond more quickly and accurately to hazardous situations.

Figure 1:
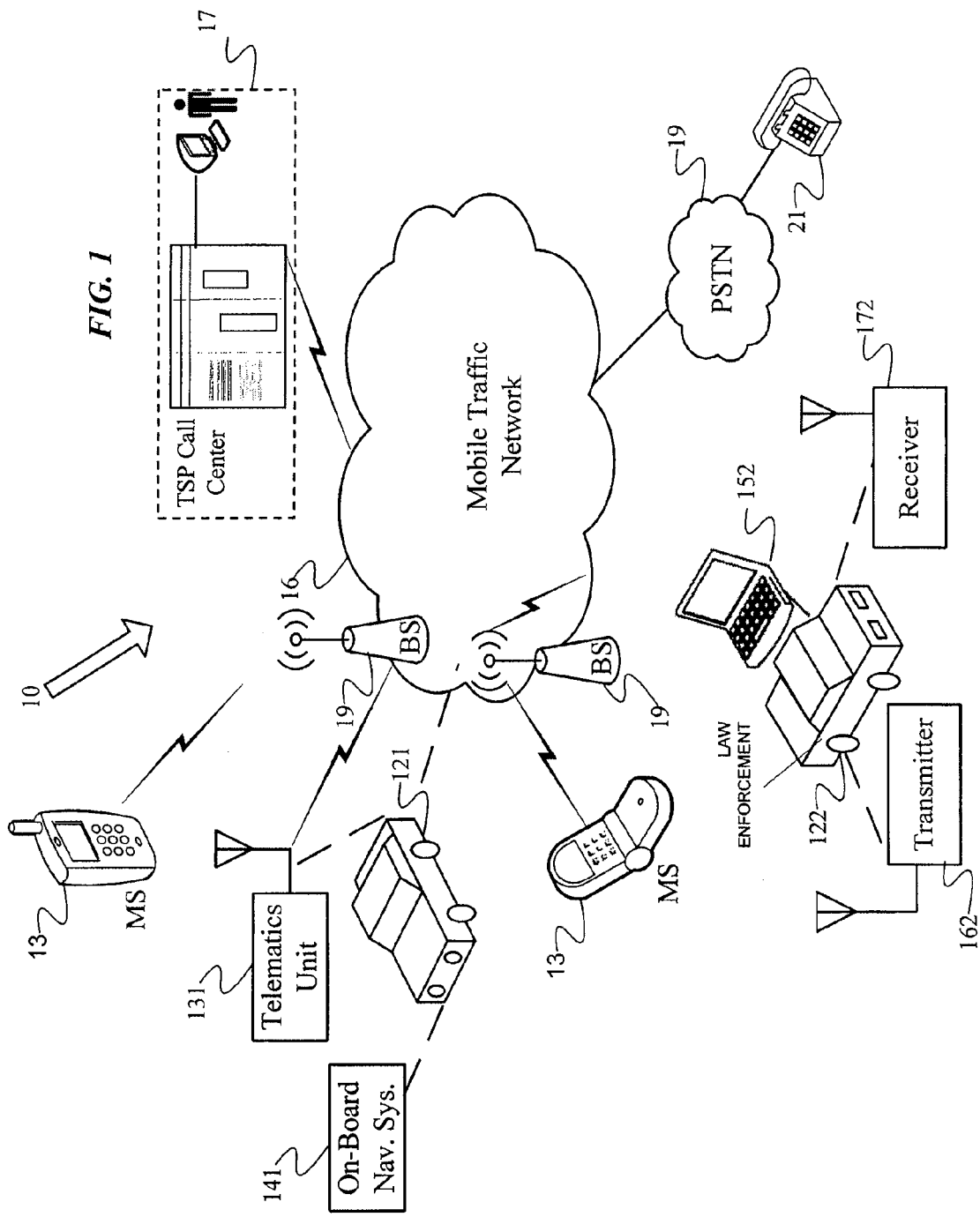
FIG. 1 is a functional block diagram of a system of networks and other equipment, for providing wireless communication services for mobile stations and for telematics communications, in which at least some telematics units are enhanced to allow law enforcement personnel to gain access to private vehicle information when using the appropriate authorization code.

Reference now is made in detail to the examples illustrated in the accompanying drawings and discussed below. FIG. 1 illustrates a functional block diagram of an exemplary system of networks for providing mobile voice telephone services and various other data services, including telematics services. In this system, the network 10 is a wireless mobile communication network. The network 10 often (but not always) comprises networks operated by a number of different mobile communication service providers, carriers, or operators, although for simplicity of discussion network 10 is assumed to be a network operated by one carrier. The communication network 10 provides mobile voice telephone communications as well as other services such as text messaging and various multimedia packet data services, for numerous mobile devices. One type of mobile device shown in the drawing is a users' mobile station 13. The network 10 supports a variety of application services. However, for purposes of discussion, the drawings show an example in which one of the application services relates to telematics service.

Hence, the drawing discloses a vehicle 121 having an associated telematics unit 131 and an onboard navigation system 141. The telematics unit 131 alone or in combination with the onboard navigation system 141 is configured for location and velocity detection, crash detection, emergency communication functions, and to store other relevant vehicle related information. Such information may include the vehicle identification number (VIN), location and velocity information, diagnostic information about the vehicle, and any other useful information such as information regarding whether the vehicle is insured. The drawings also show a law enforcement vehicle 122 with an onboard computer 152, transmitter 162 and receiver 172 for transmitting and receiving information. In the current example, a police vehicle with an onboard computer system is used for purposes of illustration but it will be obvious to one of ordinary skill that the equipment allowing the authorities to obtain the vehicle information via the telematics unit may be implemented in or in combination another type of law enforcement device, such as a laser gun, a speed camera, a red light camera, or an electronic toll collection device that implements similar functions.

From the network perspective, the telematics unit 131 is another type of mobile device that communicates via the wireless mobile communication network 10. However, for purposes of law enforcement identification and information retrieval, the telematics unit 131 may communicate directly with the onboard computer 152 of the law enforcement vehicle 122 using a short range broadcast medium as long as the user vehicle 121 and law enforcement vehicle 122 are within a certain short range of each other. The request for vehicle identification information, or any other request for information, along with the authorization code, may be sent directly from police vehicle 122 to user vehicle 121 over the short range medium without passing through the network. Similarly, any messages containing requested vehicle identification information and/or any other requested information, may be sent directly from user vehicle 121 to police vehicle 122 over the short range medium without passing through the network.

In some examples, the information requested as well as the authorization code used by law enforcement may be sent to the call center 17 of the telematics service provider via the network 10. The network 10 may implement wireless communications with the mobile stations 13 (and similar mobile telematics unit 131) via any of a variety of different standard communication technologies common in public wireless mobile communication networks. Examples of such technologies include various CDMA standards, including 3GPP2 variants thereof (e.g. 1XRTT or EVDO) as well as TDMA and GSM standards including 3GPP variants (e.g. LTE or UMTS). The mobile stations 13 and the communications elements of the telematics unit 131 would be configured to communicate in accord with the wireless standard supported by the network 10, and, in addition, using short range broadcast media. Additionally, the telematics unit 131 would also be configured to communicate directly without requiring network access by using, for example, WiFi, RF or any other suitable short range broadcast medium for the direct wireless communications.

The mobile communication network 10 typically is implemented by a number of interconnected networks. Hence, the overall network 10 may include a number of radio access networks (RANs) each including any number of base stations (BSs) 19, as well as regional ground networks interconnecting a number of RANs and a wide area network (WAN) interconnecting the regional ground networks to core network elements. A regional portion of the network 10, such as that serving mobile station 13 and the telematics unit 131, will typically include one or more RANs and a regional circuit and/or packet switched network and associated signaling network facilities.

The radio access networks also include or connect to a traffic network represented generally by the cloud shown at 16, which carries the user communications for the mobile stations 13 and the telematics unit 131 between the telematics service provider call center 17 and other elements with or through which the various wireless mobile devices communicate. Individual elements such as switches and/or routers forming the traffic network 16 are omitted here for simplicity. The emergency communications extend through a wireless network offering mobile communication service to data and voice communication equipment at the TSP call center 17. In a typical operation, the telematics unit 131 will detect a vehicle condition indicating a crash or other emergency condition of the vehicle 121 or will detect actuation of an "emergency" or "panic" button associated with the telematics unit 131 by a user of the vehicle. In response, telematics unit 131 initiates communication through the mobile communication elements of the network 10 with TSP call center 17.

A number of the activities involved in law enforcement authorization are implemented by communication with the telematics unit and/or involve responsive processing in that unit. It is assumed that those skilled in the art are generally familiar with the structure, programming and operations of mobile stations and telematics units that utilize mobile communication transceivers similar to those of mobile stations. However, to fully understand the relevant communication and processing under discussion here, it may be helpful to some readers to consider a summary discussion of the structure and programming of an example of a telematics unit, before discussion of the detailed examples of process flows for law enforcement authorization.

Figure 2:
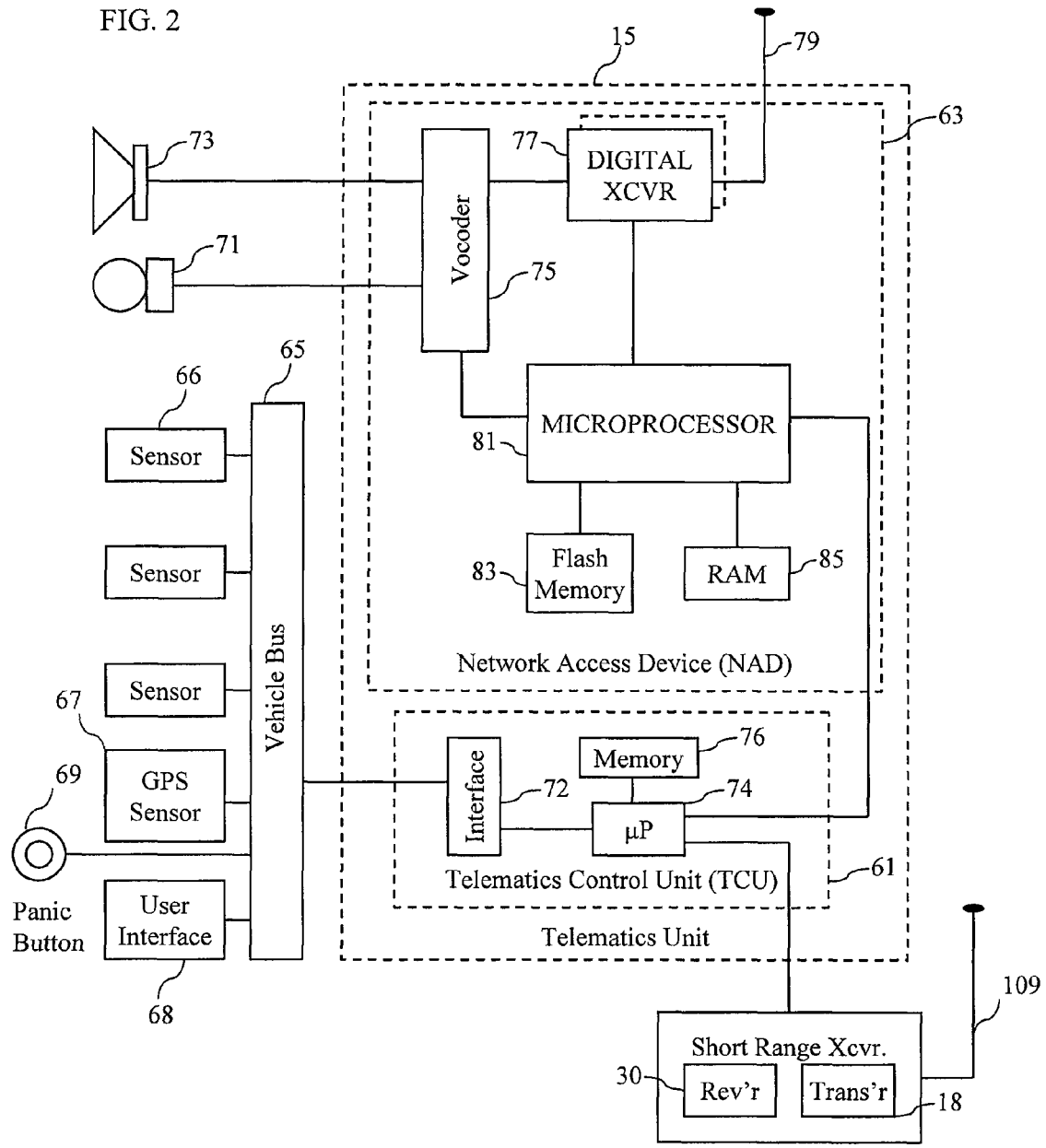
FIG. 2 is a functional block diagram of an exemplary telematics unit, and associated equipment, as may be used in a vehicle application.

FIG. 2 is a block diagram of an exemplary telematics unit 15 (corresponding to unit 131 in FIG. 1) and associated equipment, as may be used in a motor vehicle. The telematics unit 15 includes a telematics control unit (TCU) 61 and a wireless Network Access Device (NAD) 63. The TCU 61 may be implemented as a microprocessor (μP) 74 with one or more memories 76, an interface 72 to vehicle equipment, and an interconnection to the NAD 63. Microprocessor 74 acts as a controller for controlling all operations of the TCU 61. These functions include vehicle monitoring and emergency notification. Microprocessor 74 is a programmable controller. Programming in the memory 76 of the TCU 61, for example, enables the TCU microprocessor 74 to process the data received from law enforcement in the vicinity via receiver 30 as well as to authenticate an authorization code when used to gain access to vehicle identification information or any other information that law enforcement may desire. Additionally, TCU 61 processes location and velocity information of the user's vehicle from sensor 67. TCU 61 works as a processor with memories, interfaces, and programming to implement authorization code authentication and response functions. TCU 61 may also process information obtained from any of several sensors 66 via the interface 72. For example, if one of the sensors 66 is a crash sensor, the TCU 61 may also process information obtained from that sensor to detect a collision hazard condition and provide a hazard alert. Information may also be processed to detect occurrence of a collision or other the emergency condition, and, in response, instruct the NAD 63 to initiate an emergency call to the telematics service provider (TSP).

Figure 3:
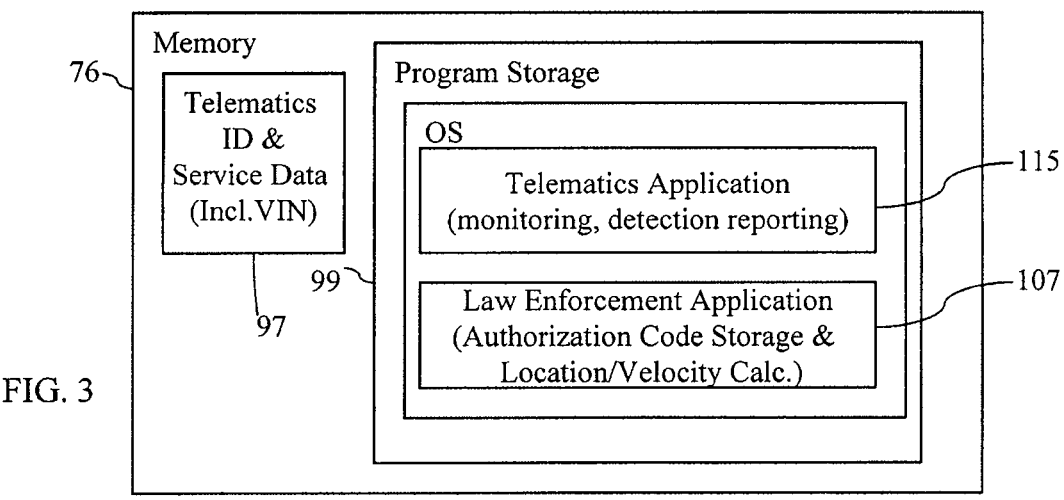
FIG. 3 is a functional block diagram showing a high level representation of the storage that may be provided by the memory in a telematics control unit used in a vehicle application.

It may also be helpful to briefly discuss programming and data storage of the TCU 61. FIG. 3 is a high level representation of the storage that may be provided by the memory 76 and thus of relevant data and programming that may be stored and/or loaded into portions of the memory 76 of the TCU. As shown, portion 97 stores telematics identification and service data used by the TSP, such as customer identification data, electronic toll collection data, vehicle identification number, and/or security keys and authorization codes such as those used by law enforcement to gain access to vehicle information. Some of this data, such as the VIN, may be permanently stored in the portion 97 of the TCU memory 76, whereas some of the telematics service data, such as the authorization codes, may be downloaded after the unit is installed in the vehicle manually or over the air (OTA), the OTA function will facilitate updates to the authorizations keys. For law enforcement access purposes, portion 97 may hold a single authorization code that may be used by multiple law enforcement branches and officials or, alternatively, multiple authorization codes may be stored. In examples where multiple authorization codes are stored, these authorization codes could be used to specifically identify who is requesting the information. For example, one authorization code may by associate with local law enforcement while another code may be associated with state law enforcement. By using a particular authorization code, the requester may identify which branch of law enforcement is requesting the information. One of ordinary skill will recognize that these authorization codes may be used in a variety of ways to assist in identification of the requester. Additionally, different authorization codes may grant different access rights. For example, some codes may give access to all vehicle related information and functions, allow only transmission of vehicle identification, or any variation thereof.

Another portion 99 of the memory 76 stores programming that is to be executed by the microprocessor 74 of the TCU 61. The programming typically includes an operating system (OS) including various device drivers, e.g. for communication with various vehicle systems and sensors via the bus 65, and for communication with the receiver 30 and the NAD 63. The programming will also include a telematics application 115 running on the OS, to enable the microprocessor 74 to implement regular telematics functions, such as vehicle diagnostics, monitoring vehicle location and velocity, detection of emergency conditions, communications with other vehicles and devices via the receiver 30, communications via the NAD 63 and the network to report emergencies, vehicle law violations, information requests received from law enforcement, and the like.

The law enforcement authorization application 107 enables the microprocessor 74 to carry out various information communications and/or deceleration or disabling actions in response to a message received via the receiver 30 containing a recognized authorization code. The relevant operations may be implemented by carrying out or execution of programming code in the form of software, firmware, or microcode running on one or more of the controllers. The software functionalities involve programming, including executable code as well as associated stored data, for causing the telematics unit to determine whether a message received contains a proper authorization code which would allow access to the information being requested. In examples where more than one authorization code is stored in portion 97, this application may also identify who is requesting the information and/or confirm that the requester has the right to access the information being requested.

Law enforcement application 107 may also trigger telematics application 115 to obtain information such as vehicle diagnostic information, location and velocity information, or the like. It may also trigger the telematics application to cause the vehicle to take some action such as causing the vehicle to decelerate in response to a deceleration request from law enforcement personnel. Further, it may trigger the telematics application to disable the vehicle in situations where law enforcement is pursuing the vehicle or where the vehicle driver is violating a law. The law enforcement application might also encrypt the information received from telematics application 115 so that the information could only be accessed by the requesting law enforcement personnel.

Hence, operations described above may be carried out by execution of programming code in the form of software, firmware, or microcode running on one or more of the controllers of the telematics units and/or by processing of relevant data on such programmable devices. The software functionalities involve programming, including executable code as well as associated stored data, for causing the telematics unit to implement emergency detection as well as the access code authorization and related functions, as exemplified by the discussions above. Code for implementing the telematics and authorization functions may be in the form of computer instruction in any form (e.g. source code, object code, interpreted code, etc.) stored in or carried by any computer or machine-readable medium. In operation, the executable code is stored in an area of memory or the like within the respective telematics unit. At other times, however, the programming may be stored at other locations and/or transported for loading into respective equipment, e.g. into the particular telematics unit from a server or the like.

Hence, implementations of the teachings presented herein typically involve one or more software products in the form of one or more modules of executable code and/or data carried by at least one machine readable. Execution of such code by a processor or the like of a telematics unit for example enable the unit to implement steps such as those outlined below in the discussion of the law enforcement vehicle authorization flow examples.

Returning to FIG. 2, the TCU 61 is also programmed to process wireless data received through the receiver 30. Such information includes vehicle identification requests, vehicle information requests, and authorization codes needed to determine whether access to the information should be granted and whether the information should be transmitted via transmitter 18 discussed more below.

The receiver provides the data received to the microprocessor 74. In the current example, the receiver 30 is directly connected to microprocessor 74 but one of ordinary skill will recognize that it may also be connected through the vehicle bus 65. The receiver 30 is directed toward short range communications. It receives wireless messages broadcast wirelessly directly from other law enforcement vehicles or devices within the range of a short range broadcast medium unlike the NAD 63 which transmits and receives messages from the TSP call center. Law enforcement devices that receiver 30 may communicate with include red light cameras, speed cameras or electronic toll collection devices. Because the receiver 30 does not communicate with the TSP call center, WiFi and/or other short range broadcast media may be used to carry the wireless messages transmitted. The range will depend on the particular characteristics of the short range broadcast medium used. In some examples, the range is approximately five hundred feet.

It should be noted that at least one sensor must be capable of determining location by global position satellite (GPS) processing. In the current example, one of the sensors 66 is a GPS sensor or receiver 67. The GPS sensor 67 is connected to the TCU 61 through the vehicle bus 65 but it should be understood that the GPS sensor may be connected though other components as well. For example, the GPS sensor may be a GPS transceiver located within the NAD 63.

Looking to the current example, the GPS sensor, under control of the microprocessor 74 receives and processes signals from one or more satellites of the GPS constellation of GPS satellites. From its processing, the GPS sensor supplies GPS data to the microprocessor 74, such as pseudorange measurements and associated pseudorandom number (PN) codes for measured satellite signals. Associated computations may be performed in the microprocessor or by a processor or the like included in the GPS sensor to obtain a final fix (latitude and longitude coordinates) as the location of the vehicle. The microprocessor processes the location data over time to determine velocity (direction and speed of travel).

Once an authorization code is verified via the short range receiver 30, the information requested may be sent back to the law enforcement vehicle or device. In order to transmit the data, a short range transmitter 18 is used. The transmitter 18 may be connected to TCU 61 and may broadcast location and velocity information obtained via the sensors 67 using antenna 109. As illustrated in FIG. 2, antenna 109 is used to transmit information from transmitter 18 and receive information from receiver 30 but it will be apparent to one of ordinary skill that antenna 109 may be omitted and the transmitter and receiver may be connected directly to antenna 79 in the NAD 63. The wireless messages transmitted by transmitter 18 using a short range broadcast medium similar to that used for receiver 30 such as WiFi or the like. In some examples, receiver and transmitter may be replaced by, or part of, a transceiver for carrying out both transmitting and receiving.

A vehicle typically includes a vehicle bus, shown at 65 in FIG. 2, for providing digital data communications among various onboard devices/systems, particularly for vehicle diagnostics purposes. In addition to GPS monitoring, the vehicle also includes one or more sensors for detecting conditions that may indicate an obstacle or emergency. The vehicle bus 65 provides the continuous electrical connection within the vehicle for the communication of diagnostics data from the various sensors 66 to the TCU 61. The TCU is programmed to process data received from the sensors to monitor the GPS location and velocity of the vehicle as well as to detect any possible emergency such as a vehicle crash and to generate data regarding the detected crash, e.g. to indicate severity.

The vehicle includes one or more elements for detecting an emergency, for the purposes of triggering automatic reports to the call center of the telematics service provider. For example, the vehicle may include a panic button 69 which may be used as an emergency detector. The panic button is coupled to and communicates with the TCU 61 via the vehicle bus 65. A vehicle occupant would activate the panic button 69 in the event of an emergency. If a crash occurs, an emergency detector will be triggered automatically. In some examples, the emergency detector may be a crash responsive sensor among the sensors 66.

The TCU 61 may determine that there has been an emergency event that warrants a report to the TSP call center. This may occur in response to crash detection information from the processing of the data from the sensors 67 or in response to activation of the panic button 69 by the vehicle user. Further, the TCU 61 may be programmed to report a request for vehicle information from law enforcement. In response to any determination of a collision, an emergency condition, or request for vehicle information, the TCU 61 activates the NAD 63 to initiate the communication with the TSP call center.

The NAD 63 acts as the communications tool for entry to the wide area wireless network via cellular communications. The NAD 63 is a wireless transceiver unit configured for communications via the wireless communication facilities of the mobile network and associated landline facilities. NAD 63 will send a signal to the TSP call center alerting the call center of the possible emergency. In some examples the NAD 63 will be activated in response to a request for vehicle information. In such a case, the NAD 63 will send a message notifying the TSP call center that a request for information has been received from an authorized law enforcement vehicle and may also identify the information requested.

Additionally, in some examples, the NAD 63 may be used to carry out, report or otherwise assist in certain functions that are currently carried out by law enforcement devices. These functions may include transmitting information as to a traffic law violation (or attendant communication to law enforcement equipment), such as running a red light or speeding, directly to the TSP call center. If the telematics unit is used in conjunction with an electronic toll collection device, the NAD 63 may be used to signal to the TSP call center to notify the toll-collecting agency that the toll amount should be deducted from the user's account or, alternatively, may transmit identification information such that the TSP call center and/or law enforcement may be notified when a vehicle has crossed a toll collection location. In some examples, the telematics unit may have the electronic toll collection capabilities incorporated in its programming so that it may replace electronic toll collection devices all together.

It should be noted that the law enforcement information transferred via NAD 63 to the TSP call center and/or law enforcement may also be transferred to a law enforcement device via receiver 30 described above. In such examples, the law enforcement devices may transfer such information using their own network access devices to the appropriate recipient.

The NAD 63 is generally similar to a wireless mobile station configured for voice and data communications. It is assumed that those skilled in the art are familiar with the structure and operation of mobile stations and thus with the structure and operation of generally similar devices that may be used to implement the NAD 63. To insure a full understanding by all readers, however, it may be helpful to consider a high level summary review of the relevant structure of one example of a NAD 63.

The NAD 63 supports both data communication and voice communication. For the voice communication function, the vehicle will include a microphone 71 for audio signal input and a speaker 73 for audio signal output. The microphone 71 and the speaker 73 connect to voice coding and decoding circuitry (vocoder) 75 within the NAD 63. During a voice telephone type communication with the TSP call center, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The transceiver 77 would be used to transfer any data obtained regarding an authorized law enforcement information request as well as any information requested. In an example where more than one authorization code is included, it may also transfer information regarding which branch or division of law enforcement is making the information request. In some examples, information may be requested in response to a traffic violation. In such an example, the vehicle information, any related information from the vehicle sensors, and possibly information about the traffic violation itself such as the vehicle's velocity, may be transmitted. Additionally, if a crash occurs any additional crash related information obtained by sensors 67 will also be sent to the TSP call center.

The concepts discussed here encompass embodiments of the NAD 63 utilizing any digital transceivers that conform to current or future developed digital wireless communication standards. For example, the digital transceiver 77 may be a CDMA transceiver compatible with operation via an IS-95 network or a 1x-RTT network, to provide both voice and/or data communications. The transceiver 77 provides two-way wireless communication of information, such as vocoded speech samples and digital message information. The transceiver 77 also sends and receives a variety of signaling messages in support of the various communications provided via the NAD 63 and the various wireless network facilities.

The transceiver 77 connects through RF send and receive amplifiers (not separately shown) to an antenna 79. Antenna 79 is used to communicate information to and from the TSP call center but it should be noted that antenna 79 might also be used by receiver 30 to obtain GPS information. Although antenna 79 is located in the NAD 63 in the current example, it may also be coupled to the TCU 61. In the current example, receiver 30 is also connected to the antenna 109 but in other examples antenna 109 may be omitted and receiver 30 may be connected to antenna 79 as well.

The NAD 63 may include one or more additional transceivers, as shown in dotted line form, for operation in an analog mode or in accord with an alternative digital standard, such as EVDO. In the event of a crash, information obtained from the sensors 66 and/or 67 (e.g. location and type of emergency event) as well as information obtained via receiver 30 (e.g. law enforcement vehicle information request) will be transferred to the NAD 63 to be communicated to the call center of the TSP. Notification of the law enforcement request allows the TSP call center to know if any law enforcement personnel are located near the accident site and, if the telematics unit is still working after the crash, may assist in notifying the TSP call center that emergency help has arrived. This information, stored in TCU 61, would be transferred from microprocessor 74 of TCU 61 to microprocessor 81 of NAD 63.

A microprocessor 81 acts as a control unit for controlling all operations of the NAD 63. The microprocessor 81 is a programmable control unit. The NAD 63 also includes flash type program memory 83 and/or a non-volatile random access memory (RAM) 85, for storing various software routines and mobile configuration settings, for use by the microprocessor 81. The actual emergency or automatic dialing program implemented by the telematics unit may be stored in the flash memory 83 of the NAD 63. Alternatively, this programming may be stored in program memory of the TCU 61.

Those skilled in the art will recognize that the distribution of programming as between the TCU and the NAD is only given here by way of example. Programming functions may be shifted between these two elements of the telematics unit 15. For example, the actual emergency dialing program implemented by the telematics unit may be stored in the flash memory 83 of the NAD 63 or this programming may be stored in the law enforcement application 107 of the memory 76 of the TCU 61. Another approach might integrate the TCU and NAD into a single unit and thus combine programming for those elements.

In examples where the vehicle user is notified that an authorized request for information has been received, the user may be notified using user interface 68. The user interface 68 usually includes one or more elements such as a keypad and display for non-emergency input/output functions. In some examples, the keypad and display may be replaced by a touch display. The user interface 68 may also include an audio output component that provides audio output within the vehicle. This audio output may be supplied through the vehicle speaker system or other audio outputs in the vehicle. The vehicle bus 65 provides digital data communications between the user interface 68 and the TCU 61.

The structure and operation of the telematics unit 15 with the TCU 61 and the NAD 63, as outlined above, were described to by way of example, only. Those skilled in the art will recognize that the telematics unit 15 may be implemented and may operate in a variety of other ways.

Figure 4:
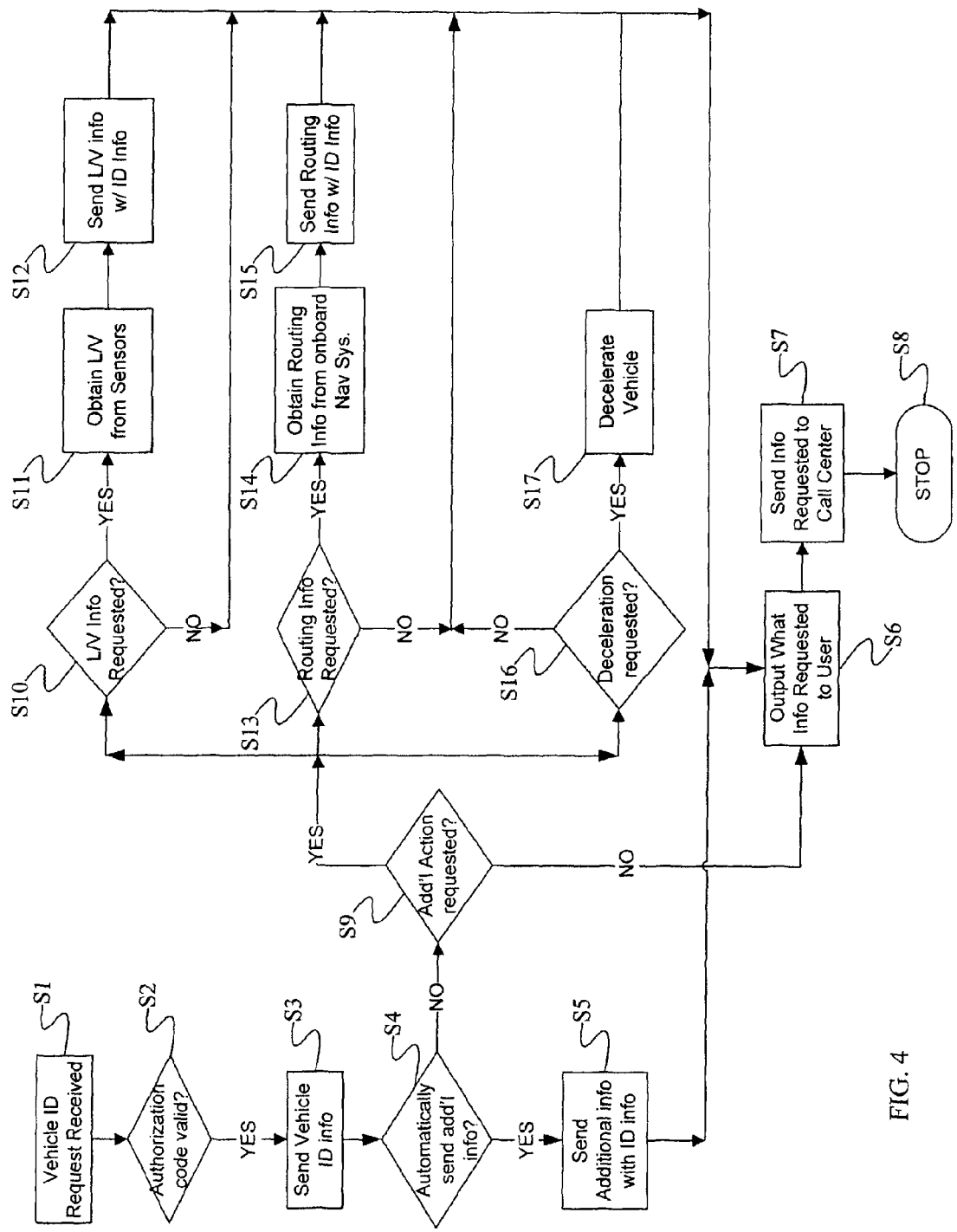
FIG. 4 is a flow chart of the law enforcement vehicle registration process and response, which may be implemented on a vehicle's onboard telematics unit.

It may be helpful now to discuss examples of process flows using law enforcement authorization applications with respect to a telematics unit 15. FIG. 4 is a flow diagram of an example which utilizes telematics unit 15 for receiving, authenticating, and responding to information requests from a party presenting a valid authorization code, typically law enforcement personnel.

A message requesting vehicle identification information is received wireless by the receiver at step S1. In the examples provided, we will assume that the message is from law enforcement personnel or a law enforcement authorized device such as a speed camera, a red light camera or an electronic toll collecting device. In the examples, the received message contains an authorization code which is verified by the telematics unit at step S2. In some examples, more than one authorization code may be used. Authorization codes may identify different branches of law enforcement such as local law enforcement, highway patrol, state police, and/or federal law enforcement. If a law enforcement authorized device is used, the authorization code may identify the device as a speed camera, a red light camera, an electronic toll collecting device, or any other device deemed useful by law enforcement. Different authorization codes may also be associated with different rankings within a particular law enforcement agency. An information request message received from a law enforcement vehicle of a sergeant may use a different authorization code than a message received from the vehicle of a lieutenant.

Additionally, different authorization codes may be associated with different rights. One authorization code may authorize the requester only to obtain vehicle identification information. Another may authorize the requester to receive location and velocity information in addition to the vehicle identification information. Still another authorization code used in an information request message may not only be able to request vehicle identification and location and velocity information, but may also instruct the vehicle to take some action. In some examples, a requester using the proper authorization code may disable a vehicle or instruct it to decelerate without input from the user of the vehicle.

If a received message does not contain a proper authorization code, no further action is necessary by the telematics unit. However, if a valid authorization code is used, vehicle identification information such as the YIN may be sent to the requesting party at step S3. All information will be encrypted to and from law enforcement using the authorization code and public key infrastructure (PKI) technology.

In some examples, the telematics unit may be programmed to include certain information automatically when the vehicle responds to a vehicle identification request message, either because the unit always does so, because the particular authorization code causes the unit to send the additional information or because the received message includes an additional instruction. In such examples, the telematics unit will also determine if there is other information that should be sent automatically at step S4 and include that information in the response message as in step S5. Such information may include any vehicle information deemed useful. For example, location and velocity information, diagnostic information, and/or routing information if the telematics unit is part of an onboard navigation system, may be provided. Determination of what information is sent automatically may be based on the authorization code used. For example, if telematics unit recognizes that the authorization code used in the vehicle information request message is one used by highway patrol or a speed or red light camera, location and velocity information may automatically be sent. In some examples where information needed by law enforcement is not sent automatically, it may be requested later in the process as discussed more below.

In some examples, the telematics unit may inform the user that a vehicle identification request has been received at step S6. The notification to the user may include data regarding what information was requested, who requested the information, when it was requested, or any other data that may be useful to the vehicle user. In some examples, the data would be output to the user via a visual notification on the display of the user interface. This visual notification may simply notify the vehicle user that a vehicle identification request message has been received or, in some examples, the visual notification may include additional information such as the requesting party, the list of the information requested, and any other information deemed useful by one of ordinary skill.

In some examples, the call center of the TSP service provider may be notified of a vehicle identification request at step S7. In the event additional information is requested as discussed more below, the data sent to the TSP call center may include the information requested, the information sent, as well as information regarding the authorization code used to obtain the information. For simplicity here, the process stops at step S8 after notification to the TSP call center, e.g. for record keeping and/or for future use in the event of an emergency call from the telematics unit around the time of the information communication to the law enforcement personnel.

Notifying the TSP call center may be useful when the TSP receives notice of a traffic violation, an emergency condition, or an emergency activation. If a TSP call center has record of a recent identification request message, it may transfer any information regarding traffic violations or any other information desired to law enforcement personnel. Additionally, if the authorization code used is associated with law enforcement personnel or mobile devices, the TSP call center is aware that law enforcement personnel may be nearby and may better approximate how soon assistance from law enforcement, such as a police vehicle, may arrive if an emergency condition or emergency activation has been detected. Further, if a vehicle identification request message is sent following a crash, this may indicate to the TSP call center that assistance has arrived. Various scenarios relating to telematics communications around the time of the short range information communication(s) to the law enforcement personnel are contemplated, but as the flow chart focuses of the communications most closely related to the authorization and short range information communication, specific examples/steps are omitted.

In some examples, where information is not included automatically as in step S4, a law enforcement vehicle or device may request specific action other than the vehicle identification information at step S9. This request for additional vehicle action may be included in the initial identification request message or may be received in an additional message from the requesting law enforcement party after the vehicle identification message has been sent. The additional action may involve a vehicle control function such as deceleration, but first, we will consider exemplary steps where the action relates to providing additional information. This information requested may include information similar to that included automatically as discussed above such as routing information, location and velocity information, diagnostic information, and any other vehicle information deemed useful by one of ordinary skill. In some examples, location and velocity information may be requested as detected at step S10. If such information is requested, the telematics unit will obtain the location and velocity information using the vehicle sensors at step S11 and will send that information in a message containing the vehicle identification information at step S12.

If the vehicle has an onboard navigation system, routing information may be requested as detected at step S13. The information may be strictly current information or may be information recorded over some period of time prior to the request message. This may be useful if law enforcement wants to track the vehicle or would like to obtain information regarding the vehicle's location at a particular time in the past. For example, if law enforcement believes a vehicle may have been involved in a hit and run accident, information from the onboard navigation system may help eliminate the vehicle if it has not been near the accident cite or, alternatively, may give law enforcement reason to believe that this particular vehicle was the vehicle involved. Once the information is obtained from the onboard navigation system at step S14, the information will be sent to the law enforcement vehicle along with vehicle identification information at step S15.

In some examples, a law enforcement authorization code may allow the requester to not only request information, but also instruct the vehicle to take certain actions or inactions. For example, if a vehicle is traveling at unsafe speeds, it may be useful to allow law enforcement to cause the vehicle to decelerate by sending a deceleration request as detected in the telematics unit at step S16. Upon receiving such a request from a law enforcement vehicle with a proper authorization code, the vehicle would decelerate in response to the request at step S17. In some examples such as when law enforcement is pursuing a vehicle, law enforcement may request that the vehicle decelerate to a stop or disable the vehicle in order to make it stop. Allowing law enforcement to send such a message directly to a vehicle enables the law enforcement to react quickly to respond to, or avoid, a hazardous situation. For example, some vehicle users may be startled by the flashing of lights on a highway patrol vehicle. If a vehicle is speeding, the law enforcement such as a highway patrol officer may want the vehicle to pull over to the side of the road or slow down.

In such a situation, the law enforcement vehicle may request that the vehicle decelerate prior to flashing its lights. Alternatively, the law enforcement equipment may send a message to disable the vehicle in situations where pursuit of the vehicle in current traffic conditions is dangerous. Disabling the vehicle or reducing its speed may minimize the likelihood of an accident, or its severity, in the event that the driver of the vehicle is startled by the flashing of lights on the law enforcement vehicle or when the vehicle is attempting to flee the scene of an accident or avoid law enforcement. Additionally, if the law enforcement vehicle cannot get behind a speeding vehicle to make the vehicle pull to the side of the road due to some reason, e.g. traffic congestion, the law enforcement personnel may still reduce the chance of accident. Alternatively, this may also allow a law enforcement vehicle to catch up to a vehicle it is pursuing.

Those skilled in the art will appreciate that the equipment and processes discussed above and shown in the drawings may be modified in a variety of ways. For example, the vehicle identification used in the specific implementations was the VIN. However, the vehicle identification information sent back to the law enforcement vehicle any other requested vehicle information does not necessarily need to be the vehicle's VIN. In some cases, this information may be data that indicates that a particular vehicle from a group of vehicles is the source of the information.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A telematics unit for a vehicle, comprising:
a network access device for communications via a wireless mobile communication network;
an emergency detector;
a telematics control unit responsive to an emergency detection by the detector, for controlling the network access device to initiate voice and/or telemetry communications with a call center of a telematics service provider from the vehicle through the wireless mobile communication network,
a memory accessible by the telematics control unit storing vehicle identification information and an authorization code;
a wireless transmitter controlled by the telematics control unit;
a wireless receiver for wireless reception of a vehicle identification request message; and
a system of one or more sensors for sensing location and velocity of the vehicle;
wherein in response to receipt of the vehicle identification request message, the telematics control unit is configured to:
determine whether or not the received vehicle identification request message contains the authorization code; and
upon determining that the received vehicle identification request message contains the authorization code, cause the wireless transmitter to transmit a message containing the vehicle identification information, and
wherein the telematics control unit is configured to send data regarding location and velocity of the vehicle as additional vehicle information.

2. The telematics unit of claim 1, wherein:
the receiver is further configured to receive a request for the additional vehicle information, and
the telematics control unit is further configured to respond to the additional vehicle information request when the additional vehicle information request contains the authorization code, to cause the wireless transmitter to transmit a message containing the requested additional vehicle information.

3. The telematics unit of claim 1, wherein the telematics control unit is configured to transmit the additional vehicle information in the transmitted message containing the vehicle identification information, the additional vehicle information being sent automatically without a separate request for additional information.

4. The telematics unit of claim 1, wherein the receiver receives the vehicle identification request message using a short range broadcast medium which has not gone through the wireless mobile communication network.

5. The telematics unit of claim 1, wherein the wireless transmitter transmits the message containing the vehicle identification information using a short range broadcast medium not directed through the wireless mobile communication network.

6. The telematics unit of claim 1, wherein the telematics control unit is configured to cause the vehicle to decelerate in response to a deceleration request in a received message containing the authorization code.

7. The telematics unit of claim 1, wherein more than one authorization code is stored in the memory, each authorization code containing unique identifying information and associated rights to access information.

8. The telematics unit of claim 1, wherein:
the network access device is configured to send a notification message through the wireless mobile communication network to the telematics service provider after the wireless transmitter transmits the message containing the vehicle identification information, and
the notification message contains the authorization code used in the received vehicle identification request message and/or the vehicle identification information.

9. The telematics unit of claim 2, wherein:
the network access device is configured to send a notification message through the wireless mobile communication network to the telematics service provider after the wireless transmitter transmits the message containing the requested additional vehicle information, and
the notification message contains the authorization code used in the additional vehicle information request, the requested additional vehicle information, and/or other information included in the message containing the requested additional vehicle information.

10. The telematics unit of claim 2, further comprising an onboard navigation unit wherein routing information as programmed in the onboard navigation system is sent following a request for such information in the additional vehicle information request.

11. The telematics unit of claim 1, further comprising a user interface, the user interface configured to alert a vehicle user of the vehicle identification request message and/or the authorization code used in the vehicle identification request message.

12. The telematics unit of claim 2, further comprising a user interface, the user interface configured to inform a vehicle user of the additional vehicle information request, the authorization code used in the additional vehicle information request, the requested additional vehicle information, and/or other information included in the message containing the requested additional vehicle information.

13. A vehicle identification method using a telematics unit, the telematics unit comprising: a network access device for communications via a wireless mobile communications network; a telematics control unit, responsive to an emergency detection by the detector, for controlling the network access device to initiate voice and/or telemetry communications with a call center of a telematics service provider from the vehicle through the wireless communication network; a memory accessible by the telematics control unit storing vehicle identification information and an authorization code; a wireless transmitter controlled by the telematics control unit; and a system of one or more sensors for sensing location and velocity of the vehicle, the method comprising steps of:
  receiving a vehicle identification request message wirelessly;
  determining whether or not the received vehicle identification request message contains the authorization code; and
  upon determining that the received vehicle identification request message contains the authorization code, causing the wireless transmitter to transmit a message containing the vehicle identification information and
  wherein the telematics control unit is configured to send data regarding location and velocity of the vehicle as additional vehicle information.

14. The vehicle identification method of claim 13, wherein the vehicle identification request message is received wirelessly using a short range broadcast medium which has not gone through the wireless mobile communication network.

15. The vehicle identification method of claim 13, wherein the message containing the vehicle identification information is transmitted wirelessly using a short range broadcast medium not directed through the wireless mobile communication network.

16. The vehicle identification method of claim 13, further comprising alerting a user of a vehicle that the vehicle identification request message has been received, via a user interface located in the vehicle.

17. The vehicle identification method of claim 13, further comprising steps of:
  receiving a request for the additional vehicle information message wirelessly,
  determining whether the request for the additional vehicle information message contains the authorization code; and
  upon determining that the request for the additional vehicle information message contains the authorization code, causing the wireless transmitter to transmit a message containing the additional vehicle information.

18. The vehicle identification method of claim 13, wherein additional vehicle information is included in the transmitted message containing the vehicle identification information.

19. The vehicle identification method of claim 13, further comprising causing the vehicle to decelerate in response to a request to decelerate in a received request message containing the authorization code.

20. The vehicle identification method of claim 13, further comprising sending a message through the wireless mobile communication network to a call center of a telematics service provider to notify the call center that the vehicle identification request message has been received by the vehicle, the message to the call center including information requested in the vehicle identification request message and/or the authorization code in the vehicle identification request message.

21. The vehicle identification method of claim 13, further comprising steps of:
  obtaining routing information from an onboard navigation system connected to the telematics unit, in response to a request for such information received in the vehicle identification request message, and
  causing the wireless transmitter to send the routing information.

22. The vehicle identification method of claim 13, wherein more than one authorization code may be used, the authorization code identifying the party sending the vehicle identification request message.

23. The telematics unit of claim 1, wherein the vehicle identification information includes a VIN number associated with the vehicle.

24. The vehicle identification method of claim 13, wherein the vehicle identification information includes a VIN number associated with the vehicle.

* * * * *